United States Patent [19]
Huang

[11] Patent Number: 6,007,053
[45] Date of Patent: Dec. 28, 1999

[54] RETRACTABLE TIE-DOWN ASSEMBLY WITH FINE TIGHTNESS ADJUSTMENT

[76] Inventor: Han-Ching Huang, P.O. Box 63-247, Taichung, Taiwan

[21] Appl. No.: 09/173,342

[22] Filed: Oct. 15, 1998

[51] Int. Cl.$^6$ ...................................................... B21F 9/00
[52] U.S. Cl. ........................... 254/247; 254/223; 254/364; 410/100
[58] Field of Search .................................. 254/213, 217, 254/223, 245, 247, 364; 410/100, 103

[56] References Cited

U.S. PATENT DOCUMENTS

| | | | |
|---|---|---|---|
| 2,156,062 | 4/1939 | Porter | 254/217 |
| 2,946,563 | 7/1960 | Eaton | 254/217 X |
| 2,991,975 | 7/1961 | Alexander | 410/100 X |
| 4,227,286 | 10/1980 | Holmberg | 410/103 X |
| 4,542,883 | 9/1985 | Rutzki | 254/217 |
| 4,842,458 | 6/1989 | Carpenter | 410/103 X |
| 5,271,606 | 12/1993 | Kamper | 254/217 |
| 5,282,706 | 2/1994 | Anthony et al. | |
| 5,443,342 | 8/1995 | Huang | 254/247 X |
| 5,542,798 | 8/1996 | Rawdon et al. | 410/100 |
| 5,746,192 | 5/1998 | Gissel | 254/223 X |

*Primary Examiner*—Donald P. Walsh
*Assistant Examiner*—Emmanuel M. Marcelo
*Attorney, Agent, or Firm*—Charles E. Baxley

[57] ABSTRACT

A retractable tie-down assembly includes a frame, a spool rotatably mounted to the frame, a strap wrapable on the spool, and a locking device. A holder bracket is pivotally connected to an axle of the spool. A catch member is mounted in the holder bracket. A spring includes a first end attached to the holder bracket and a second end attached to an end of the catch member to thereby bias the catch member to a position disengaged from the ratchet wheel. When the locking device is in a position engaged with a ratchet wheel on the spool and thus locks the spool against rotation in a pay out direction, and when the holder bracket is manually pivoted in a direction away from the locking device, the catch member is moved to engage with and thus exerts a force to the ratchet wheel such that the spool rotates in a retracting direction. Fine tightness adjustment of the strap is achieved by simple repeated reciprocating pivotal movements of the holder bracket.

3 Claims, 6 Drawing Sheets

6,007,053

RETRACTABLE TIE-DOWN ASSEMBLY WITH FINE TIGHTNESS ADJUSTMENT

BACKGROUND OF THE INVENTION

1. Field of the Invention

The present invention relates to a retractable tie-down assembly with fine tightness adjustment that allows the user to conveniently secure a speedboat or the like on a trailer.

2. Description of the Related Art

A trailer is generally used for hauling a speedboat or the like. The trailer includes a plurality of retractable tie-down assemblies attached thereto at various locations around the periphery of the trailer. U.S. Pat. No. 5,282,706 to Anthony et al. issued on Feb. 1, 1994 discloses a retractable tie-down assembly that includes a frame 21 and a handle 55 coupled together by a spool 30. The spool 30 includes a pair of ratchet wheels 31. A pawl 62 is mounted below the handle 55 and may be manually pushed upwardly to engage with the ratchet wheels 31. When the handle 55 is pivoted in a direction, the spool 30 is rotated in a retracted direction to take up the strap or webbing 13 onto the spool 30 and tighten the same. Nevertheless, it is found that the user must operate both the handle 55 and the pawl 62 to achieve the tightening function (fine adjustment in tightness). In addition, the pawl 62 is not securely mounted such that it may sway and thus be disconnected during transportation of the speedboat. The present invention is intended to provide an improved retractable tie-down assembly to solve this problem.

SUMMARY OF THE INVENTION

It is a primary object of the present invention to provide an improved retractable tie-down assembly that can be easily operated to achieve fine adjustment in tightness. The object is achieved by mounting a pawl in a holder bracket such that the user may operate the holder bracket to achieve the tightening function without accessing the pawl.

A retractable tie-down assembly in accordance with the present invention generally comprises:

a frame having a pair of side walls;

a spool rotatably mounted to the frame and having an axle and two end walls, at least one of the end walls being configured as a ratchet wheel, the spool being capable of rotating in a pay out direction and a retracting direction;

a strap wrapable on the spool and having one end attached to the spool;

a first spring attached to the frame and the spool and normally urging the spool to rotate in the retracting direction whereat a portion of the strap is wrapped thereon;

a locking means mounted to the frame and operable to lock the spool against rotation in the pay out direction;

a holder bracket having a first end with an extension pivotally connected to the axle and a second end;

a catch member mounted in the holder bracket and including a first end and a second end;

a second spring having a first end attached to the first end of the holder bracket and a second end attached to the first end of the catch member to thereby biasing the first end of the catch member to a position disengaged from the ratchet wheel;

a third spring having a first end attached to the second end of the catch member and a second end attached to a mediate portion of the holder bracket;

whereby when the locking means is in a position engaged with the ratchet wheel and thus locks the spool against rotation in the pay out direction, and when the second end of the holder bracket is manually pivoted in a direction away from the locking means, the first end of the catch member is moved to engage with and thus exerts a force to the ratchet wheel such that the spool rotates in the retracting direction. Fine tightness adjustment of the strap can be easily achieved by simple repeated reciprocating pivotal movements of the holder bracket.

Each side wall of the frame includes a protrusion formed on an inner side thereof for supporting the first end of the catch member at the position disengaged from the ratchet wheel.

The mediate section of the holder bracket includes a wall extended downwardly, and the second end of the third spring is attached to the wall. The wall includes a hole defined therein, and the second end of the catch member includes a prong with a distal end removably received in the hole of the wall.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
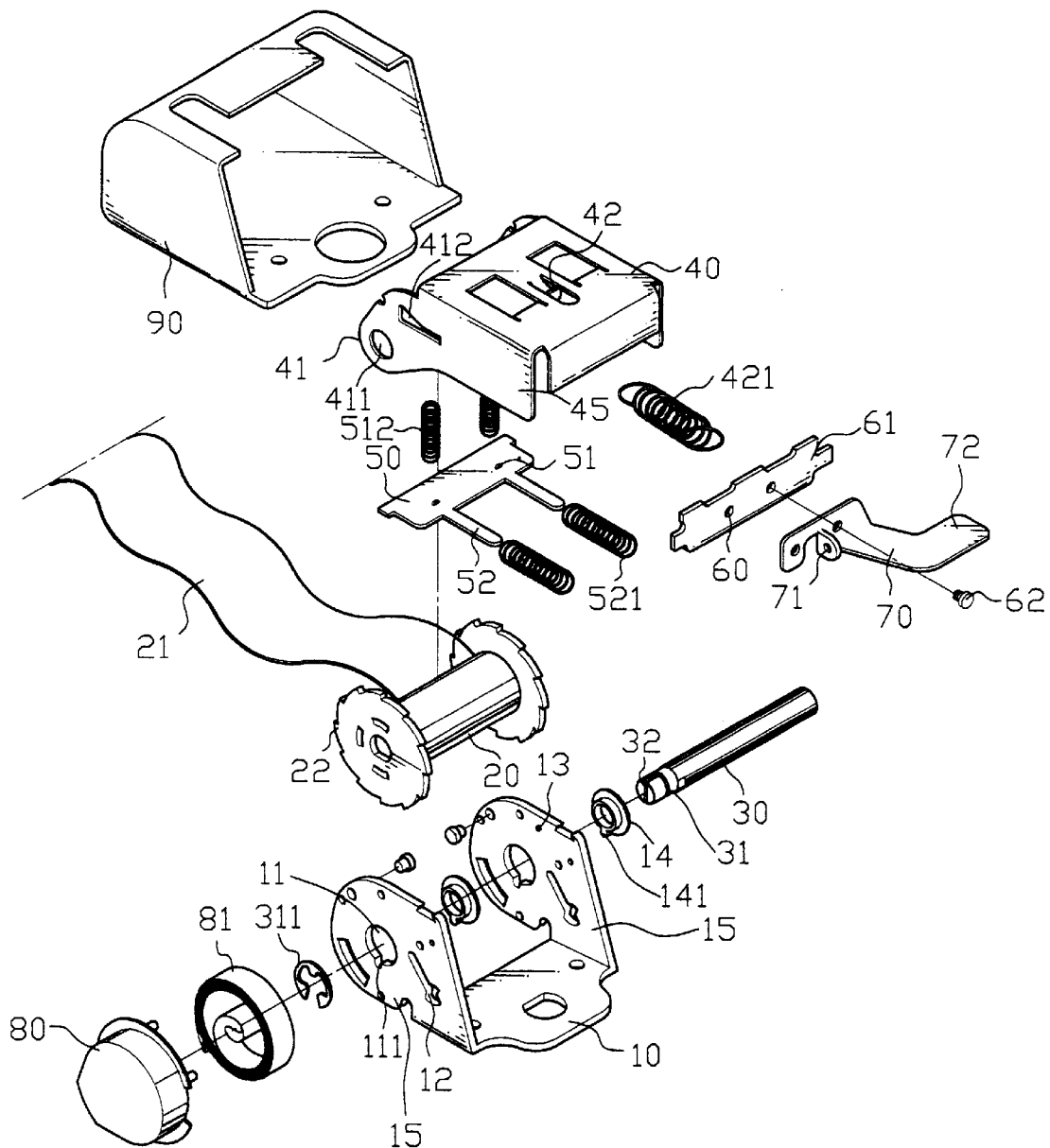
FIG. 1 is an exploded perspective view of a retractable tie-down assembly in accordance with the present invention.

Referring to the drawings and initially to FIG. 1, a retractable tie-down assembly in accordance with the present invention generally includes a frame 10 that is substantially U-shaped and includes two side walls 15 having aligned holes 11 and aligned inclined arcuate slots 12. A periphery that defines each hole 11 includes a notch 111 defined therein. A supporting ring 14 is mounted to each hole 11 and includes a key 141 received in the notch 111 to thereby retain the supporting ring 14 in place. An axle 30 is rotatably extended through the supporting rings 14 and includes an end having an annular groove 31 for receiving a C-clip 311 and a slit 32. In addition, each side wall 15 includes a protrusion 13 formed on an inner side thereof.

A spool 20 is securely mounted around the axle 30 to rotate therewith. The spool 20 includes two end walls 22 at lease one of which is configured as a ratchet wheel. The spool 20 is capable of rotating in a pay out direction and a retracting direction. A strap 21 is wrapable on the spool 20 and has one end attached to the spool 20.

A spring 81 is attached to the frame 10 and the spool 20 and normally urges the spool 20 to rotate in the retracting direction whereat a portion of the strap 21 is wrapped thereon. In this embodiment, an inner end of the spring 81 is secured in the slit 32 of the axle 30. A spring cap 80 may be provided to enclose the spring 81.

Figure 2:
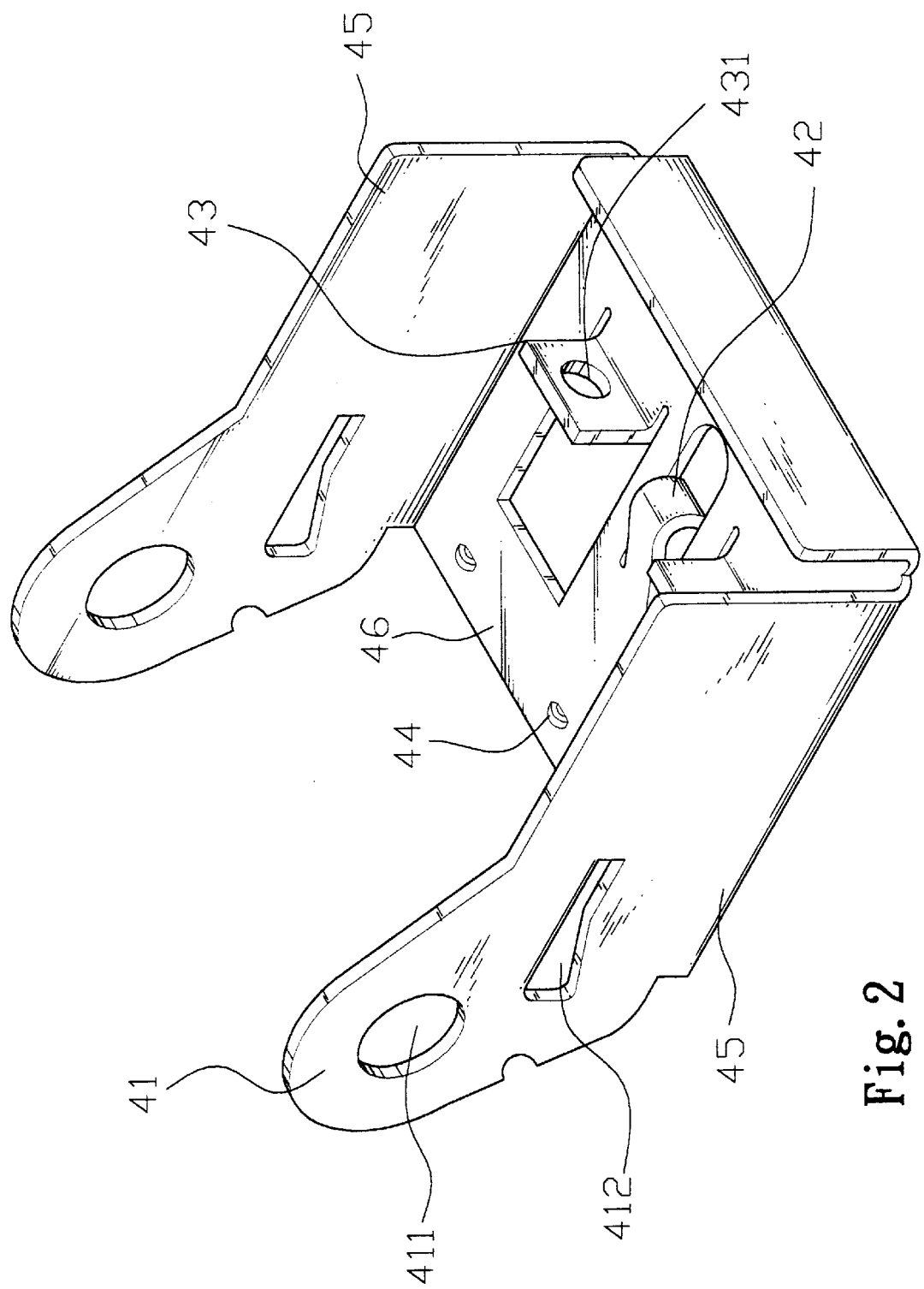
FIG. 2 is a bottom perspective view of a holder bracket of the retractable tie-down assembly.

Referring to FIGS. 1 and 2, the retractable tie-down assembly further comprises a holder bracket 40 including a pair of spaced lateral walls 45. Each lateral wall 45 includes an extended portion 41 in which a hole 411 and a slot 412 are defined. The holder bracket 40 further includes a hook 42, two spaced holed walls 43 (see hole 431 in each wall), and two hook points 44 formed on a bottom plate 46 thereof.

Still referring to FIG. 1, a pawl member 50 is mounted in the holder bracket 40. In this embodiment, the pawl member 50 includes a first end with two lateral edges (not labeled) securely received in the slots 412 of the holder bracket 40, respectively, and a second end having at least one prong 52 (two prongs in this embodiment). Two hook points 51 are formed on a side of the pawl member 50 that faces the bottom plate 46 of the holder bracket 40.

A catch member 60 is mounted in the frame 10 and includes two lateral ends slidably received in the slots 12 of the frame 10, respectively. A press plate 70 includes a first end securely attached to the catch member 60 by, e.g., a rivet 62. The press plate 70 further includes a second operative end 72 and a protrusion 71 formed on the first end thereof.

Figure 3:
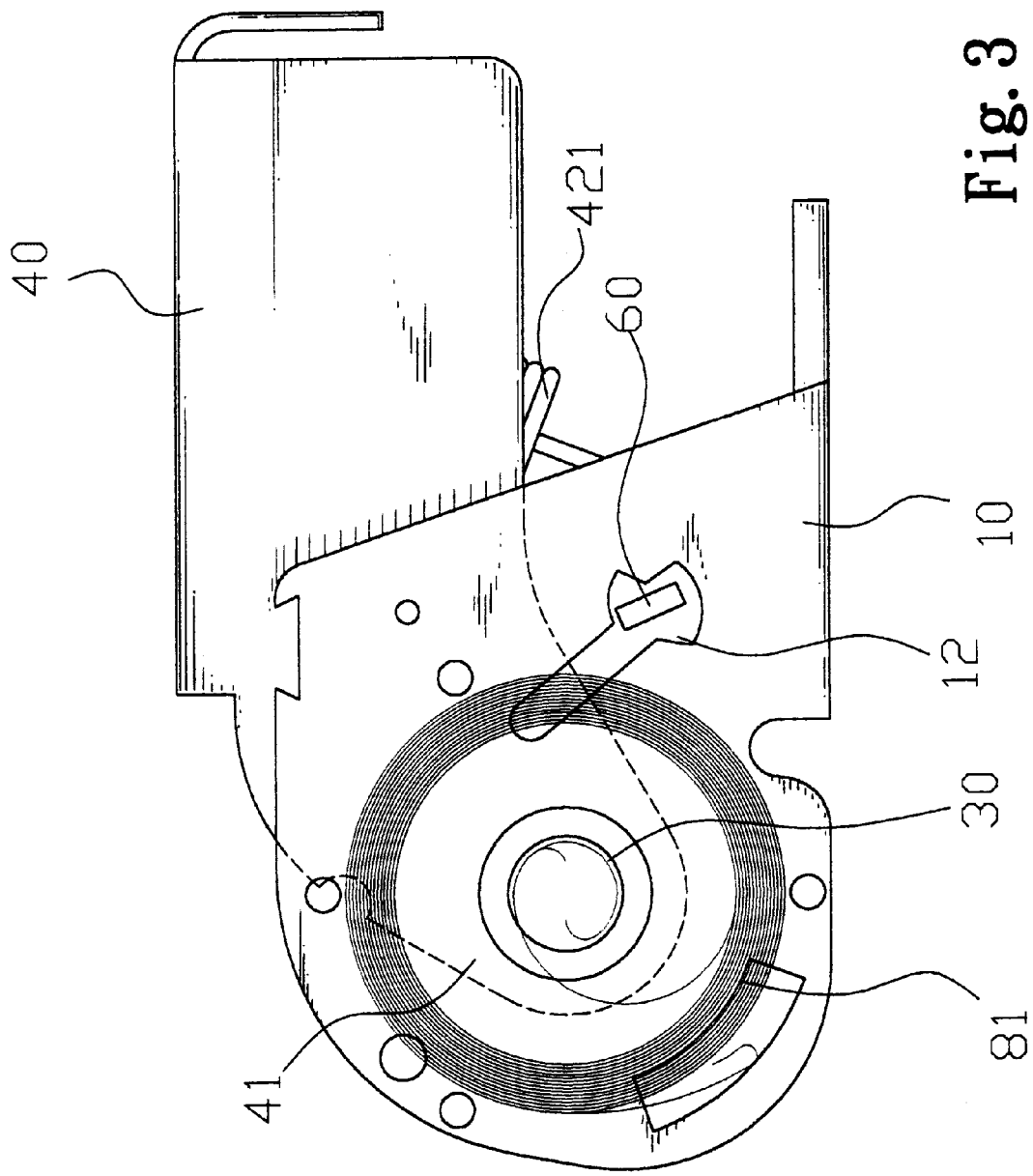
FIG. 3 is a side view of the retractable tie-down assembly.
Figure 4:
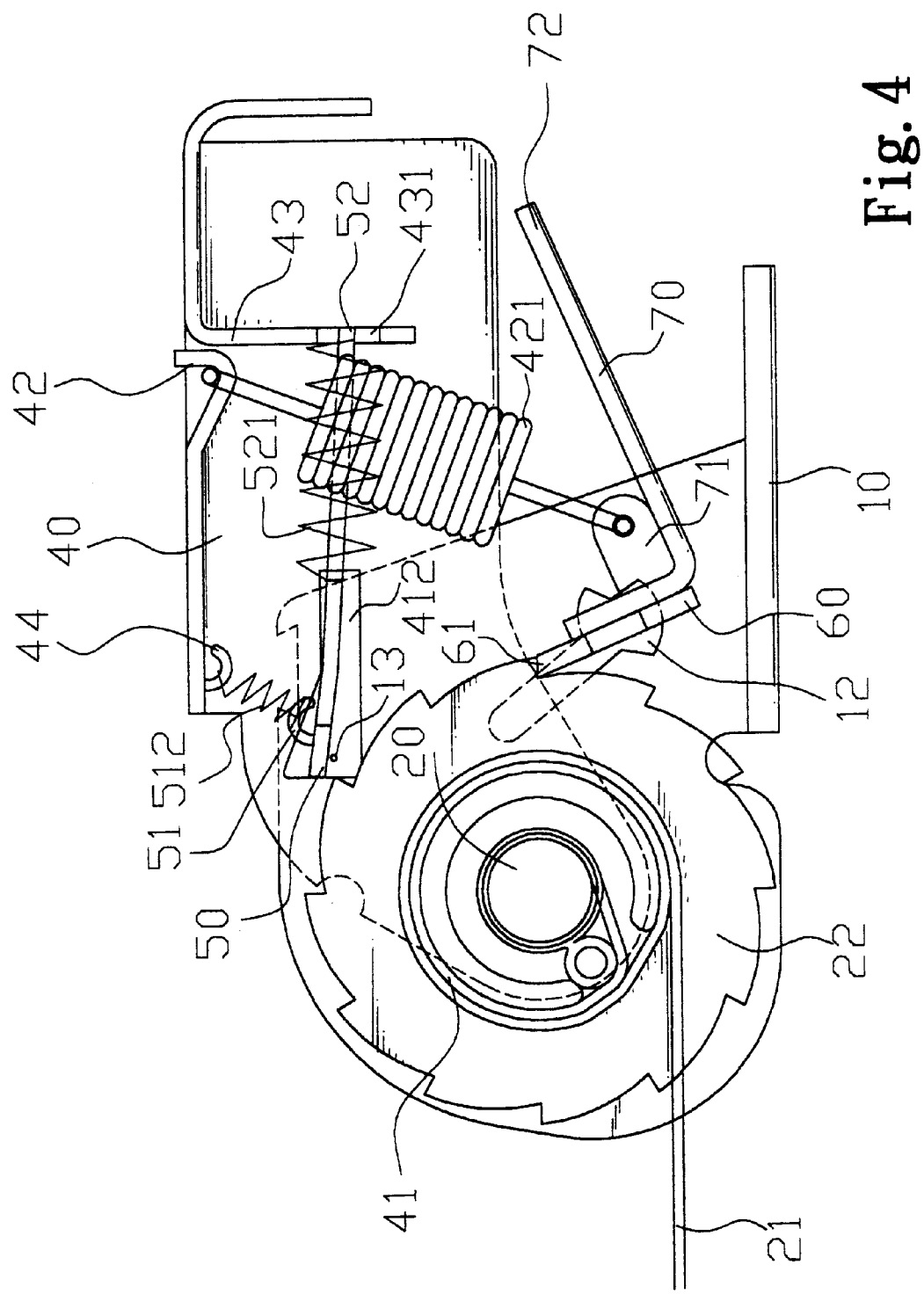
FIG. 4 is a side view similar to FIG. 3, in which a side wall of a frame of the retractable tie-down assembly is removed to illustrate detailed structure.

In assembly, referring to FIGS. 1 and 4, the two lateral edges of the first end of the pawl member 50 are securely received in the slots 412 of the holder bracket 40. Two springs 512 are provided and each includes a first end attached to one hook point 44 and a second end attached to the associated hook point 51. Two further springs 521 are provided and each includes a first end mounted around one prong 52 and a second end attached to an associated wall 43. The distal end of each prong 52 may be received in the hole 431. A further spring 421 is provided and includes a first end attached to the protrusion 71 of the press plate 70 and a second end attached to the hook 42 of the holder bracket 40 to pull the holder bracket 40 toward the press plate 70. The first end of the press plate 70 is securely attached to the catch member 60 that includes two stops 61 for releasably engaging with the ratchet wheels 22, respectively. After mounting the spool 20 between the frame 10, the axle 30 is extended through the spool 20 and further extended through holes 411 of the holder bracket 40. The frame 10 does not rotate with the axle 30 due to provision of the keys 141 and the notches 111. After mounting the spring 81 and the spring cap 80, an outer housing 90 may be provided to house the elements. FIG. 3 is a side view of the retractable tie-down assembly in an assembled status.

Figure 5:
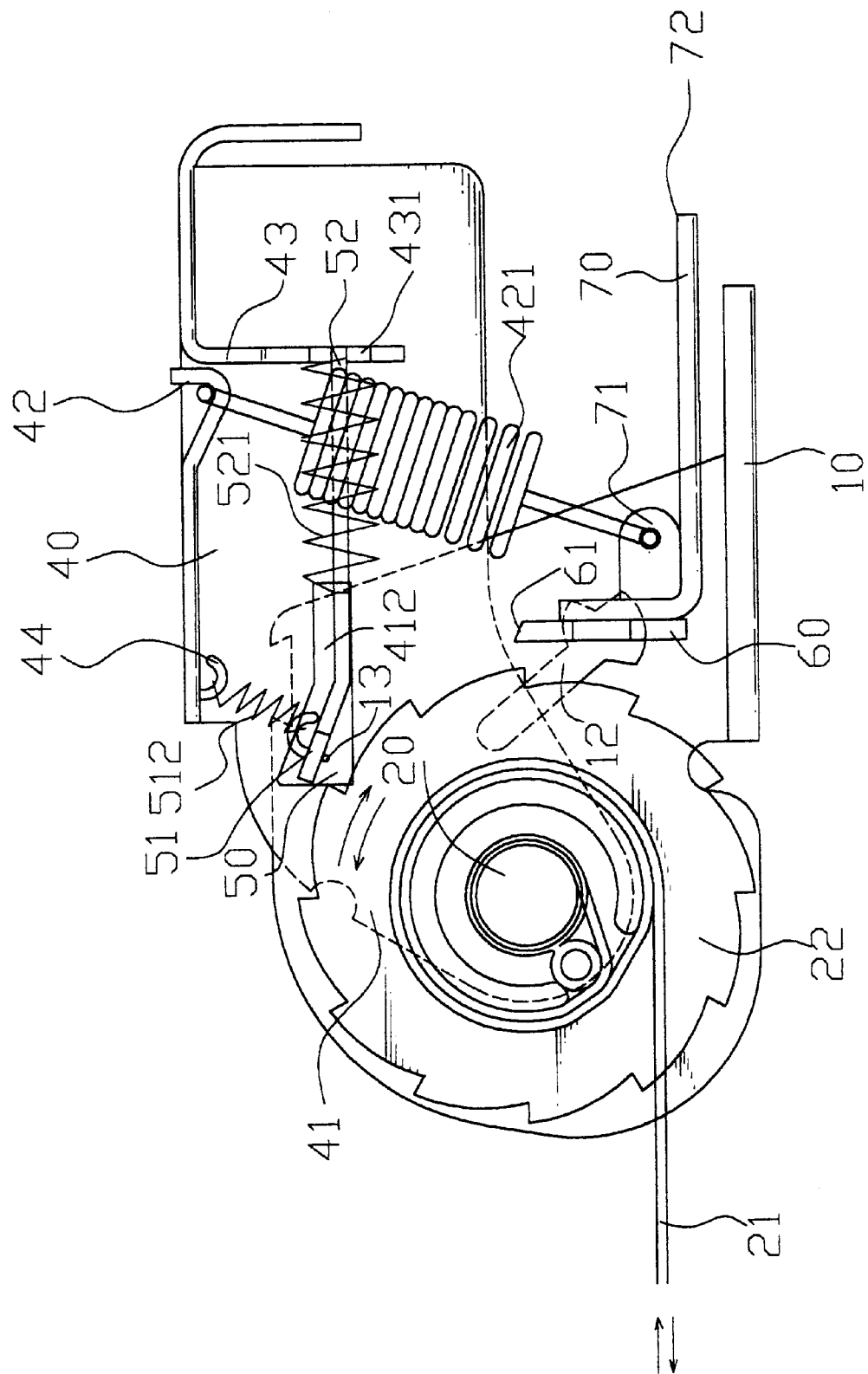
FIG. 5 is a side view similar to FIG. 4, illustrating fast paying out and retraction of a strap of the retractable tie-down assembly.

Referring to FIG. 4, the stops 61 of the catch member 60 normally engage with the ratchet wheels 22 and thus prevent rotation of the ratchet wheels 22. In addition, the first end of the pawl member 50 is retained in a position above the ratchet wheels 22 and thus not engaged with the ratchet wheels 22 by the protrusions 13 on the lateral walls 45 of the holder bracket 40 under the actions of the springs 512. Referring to FIG. 5, when the second operative end 72 of the press plate 70 is pressed, the stops 61 of the catch member 60 are moved to disengage from the ratchet wheels 22 and thus allows free rotation of the ratchet wheels 22. Namely, the user may manually pull the strap 21 in the pay out direction to a desired length and then releases the press plate 70 such that the stops 61 of the catch member 60 re-engage with and thus retain the ratchet wheels 22. The press plate 70 and the catch member 60 together act as a locking means operable to lock the spool 20 against rotation in the pay out direction. Alternatively, when the second operative end 72 of the press plate 70 is pressed, the strap 21 shall automatically wrap on the spool 20 under the action of the spring 81.

Figure 6:
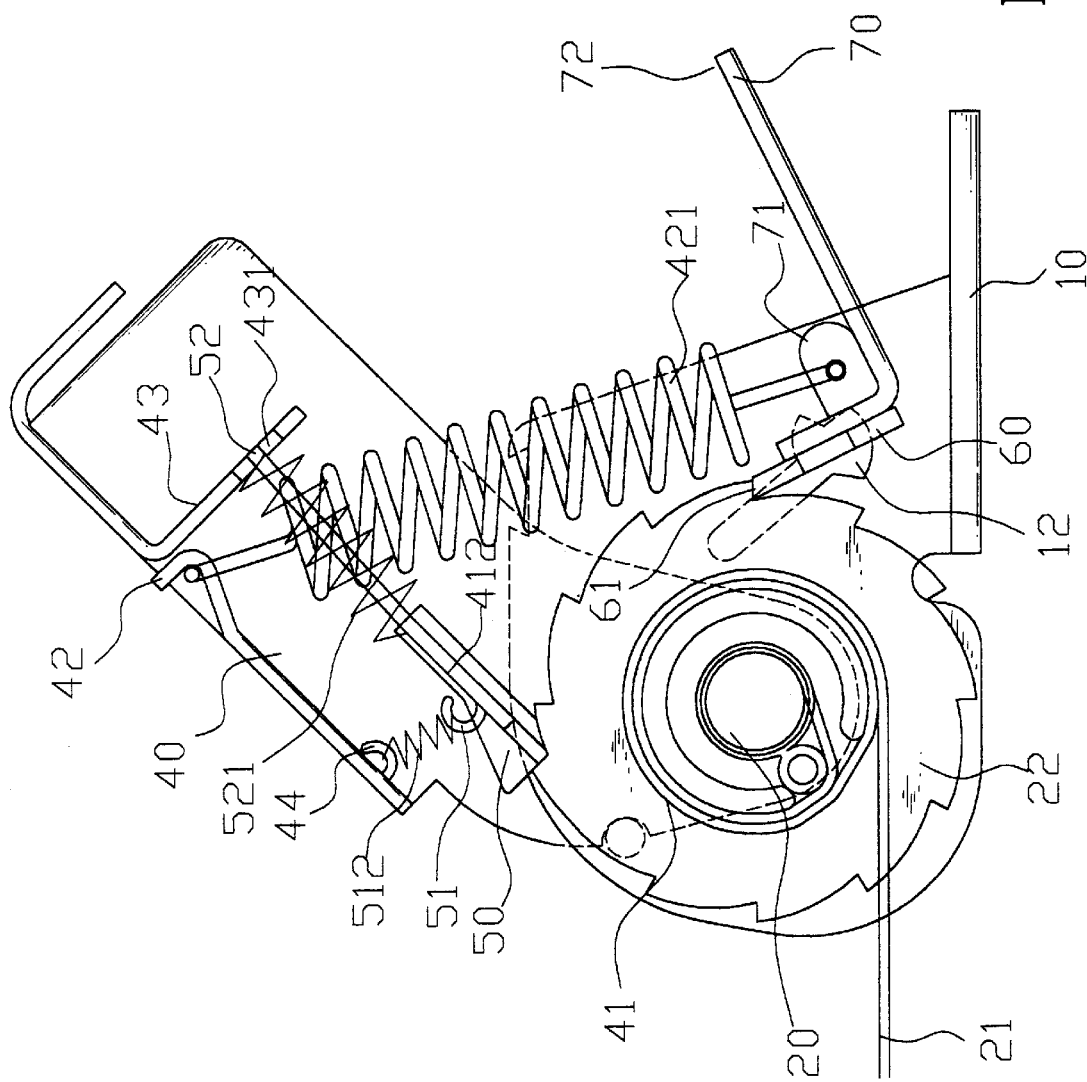
FIG. 6 is a side view similar to FIG. 4, illustrating fine tightness adjustment of the retractable tie-down assembly.

When the strap 21 is pulled to a desired length and the press plate 70 is released (see FIG. 4), the user may pivot the holder bracket 40 in a direction away from the press plate 70. As shown in FIG. 6, the first end of the pawl member 50 is moved to engage with the ratchet wheels 22 and exert a rotational force on the ratchet wheels 22. As a result, the ratchet wheels 22 are rotated in the retracting direction such that the strap 21 is further slightly wrapped on the spool 20. Release of the holder bracket 40 causes the tie-down assembly to return to a status shown in FIG. 4, yet the strap 21 is further tightened, i.e., fine tightness adjustment is achieved to reliably tighten, e.g., a speed boat on a trailer. Repeated operations of the holder bracket 40 may adjust the tightness of the strap 21 to the desired manner.

According to the above description, it is appreciated that fine tightness adjustment of the strap 21 can be easily achieved by simple repeated reciprocating pivotal movements of the holder bracket 40. In addition, the springs 512 reliably urge the first end of the pawl member 50 to bear against the ratchet wheels 22 (FIG. 6) when the holder bracket 40 is pivoted away from the press plate 70. Namely, no additional force is required to rotate the ratchet wheels 22.

Although the invention has been explained in relation to its preferred embodiment, it is to be understood that many other possible modifications and variations can be made without departing from the spirit and scope of the invention as hereinafter claimed.

What is claimed is:

1. A retractable tie-down assembly comprising:

a frame having a pair of side walls;

a spool rotatably mounted to the frame and having an axle and two end walls, at least one of the end walls being configured as a ratchet wheel, the spool being capable of rotating in a pay out direction and a retracting direction;

a strap wrapable on the spool and having one end attached to the spool;

a first spring attached to the frame and the spool and normally urging the spool to rotate in the retracting direction whereat a portion of the strap is wrapped thereon;

a locking means mounted to the frame and operable to lock the spool against rotation in the pay out direction;

a holder bracket having a first end with an extension pivotally connected to the axle and a second end;

a pawl mounted in the holder bracket and including a first end and a second end;

a second spring having a first end attached to the first end of the holder bracket and a second end attached to the first end of the pawl to thereby bias the first end of the catch member to a position disengaged from the ratchet wheel;

a third spring having a first end attached to the second end of the pawl and a second end attached to a mediate portion of the holder bracket;

whereby when the locking means is in a position engaged with the ratchet wheel and thus locks the spool against rotation in the pay out direction, and when the second end of the holder bracket is manually pivoted in a direction away from the locking means, the first end of the pawl is moved to engage with and thus exerts a force to the ratchet wheel such that the spool rotates in the retracting direction, wherein each said side wall of the frame includes a protrusion formed on an inner side thereof for supporting the first end of the catch member at the position disengaged from the ratchet wheel.

2. The retractable tie-down assembly as claimed in claim 1, wherein the mediate portion of the holder bracket includes a wall extended downwardly, and wherein the second end of the third spring is attached to the wall.

3. The retractable tie-down assembly as claimed in claim 2, wherein the wall includes a hole defined therein, and wherein the second end of the catch member includes a prong with a distal end removably received in the hole of the wall.

* * * * *